United States Patent
Valdivia Guerrero et al.

(10) Patent No.: US 10,536,099 B2
(45) Date of Patent: Jan. 14, 2020

(54) MOTOR DRIVE SYSTEM

(71) Applicant: Hamilton Sundstrand Corporation, Charlotte, NC (US)

(72) Inventors: Virgilio Valdivia Guerrero, Roquetas de Mar (ES); Raymond Francis Foley, Carraig na bhFear (IE)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/969,799

(22) Filed: May 3, 2018

(65) Prior Publication Data
US 2019/0006966 A1 Jan. 3, 2019

(30) Foreign Application Priority Data
Jul. 3, 2017 (EP) .................................... 17179400

(51) Int. Cl.
H02P 1/54 (2006.01)
H02P 5/74 (2006.01)
H02M 7/5395 (2006.01)
H02M 1/14 (2006.01)
H02M 1/12 (2006.01)
H02M 1/44 (2007.01)
H02M 5/458 (2006.01)
H02M 1/00 (2006.01)

(52) U.S. Cl.
CPC .............. *H02P 5/74* (2013.01); *H02M 1/126* (2013.01); *H02M 1/14* (2013.01); *H02M 1/44* (2013.01); *H02M 5/4585* (2013.01); *H02M 7/5395* (2013.01); *H02M 2001/008* (2013.01); *H02P 2201/13* (2013.01)

(58) Field of Classification Search
CPC ............. H02M 1/14; H02M 2001/008; H02M 7/5395; H02P 2201/13; H02P 5/74
See application file for complete search history.

(56) References Cited

U.S. PATENT DOCUMENTS

| 7,109,681 | B2 | 9/2006 | Baker et al. |
| 2005/0225270 | A1 | 10/2005 | Schnetzka et al. |
| 2011/0168697 | A1* | 7/2011 | Kazama ................... H05B 6/04 219/660 |

(Continued)

FOREIGN PATENT DOCUMENTS

| EP | 2811633 A2 | 12/2014 |
| WO | 2009008742 A1 | 1/2009 |

OTHER PUBLICATIONS

Extended European Search Report for International Application No. 17179400.1 dated Aug. 21, 2017, 8 pages.

(Continued)

*Primary Examiner* — Karen Masih
(74) *Attorney, Agent, or Firm* — Cantor Colburn LLP

(57) ABSTRACT

A power converter system comprising a power source; a plurality of voltage source converters for driving respective loads; the plurality of voltage converters connected to the power source via a common DC-link, control means (10a, 10b) for driving the voltage source converters by means of respective control signals modulated onto respective modulation carriers; and means for synchronizing the control means such that the respective modulation carriers are interleaved with a selected phase shift therebetween.

16 Claims, 5 Drawing Sheets

(56) References Cited

U.S. PATENT DOCUMENTS

2016/0329811 A1   11/2016   Du et al.

OTHER PUBLICATIONS

Zhang, Wang, Burgos, Boroyevich, "DC-Link Ripple Current Reduction for Paralleled Three-Phase Voltage-Source Converters With Interleaving", IEEE Trans. Power Electron., Sep. 2011; and Open access PhD thesis from Virginia Tech:https://theses.lib.vt.edu/theses/available/etd-05072010-115156/unrestricted/Zhang_Di_D_2010(Updated).pdf.

* cited by examiner

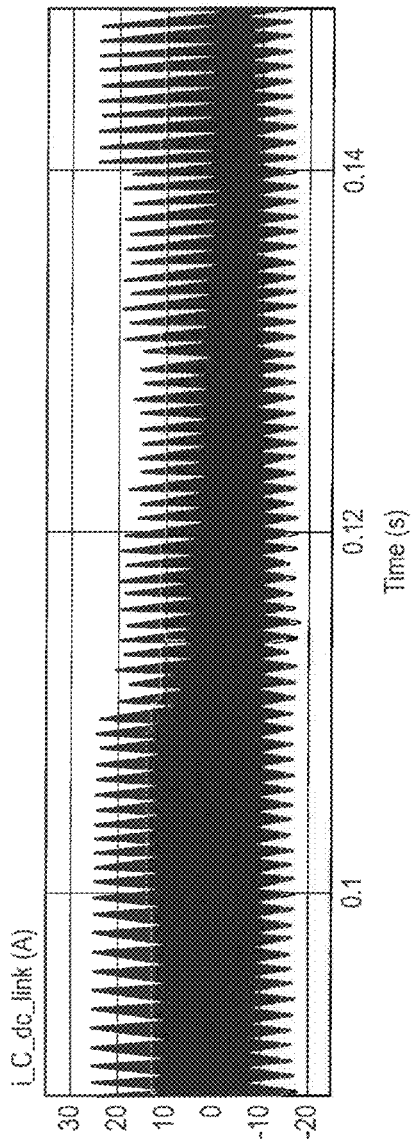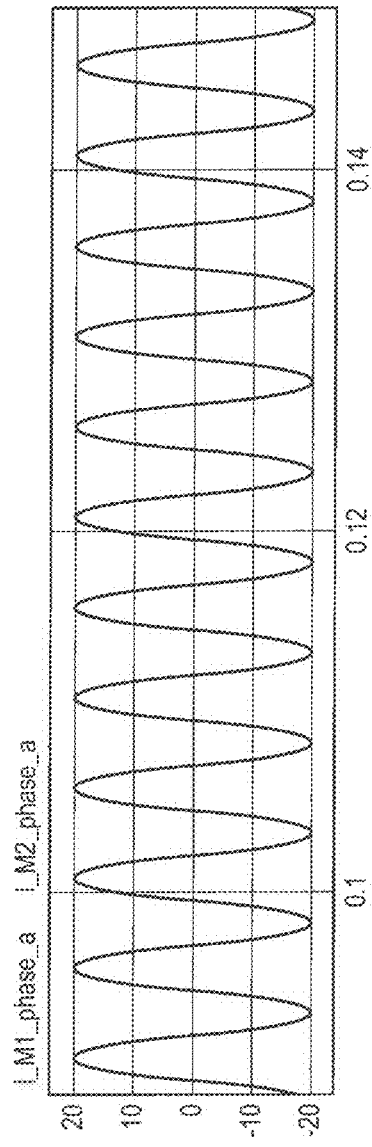

MOTOR DRIVE SYSTEM

FOREIGN PRIORITY

This application claims priority to European Patent Application No. 17179400.1 filed Jul. 3, 2017, the entire contents of which is incorporated herein by reference.

TECHNICAL FIELD

The present disclosure relates to motor drive systems particularly systems having several voltage source converters that share a common DC-link.

BACKGROUND

Voltage source converters or other source inverters e.g. current or impedance source inverters find application in a wide range of technical fields. For example, they can be used as inverters, where one or more loads are driven by a DC voltage source, or they can be used as active rectifiers to generate a DC-bus from an AC voltage source. Power management circuitry between the source and the load(s) ensures efficient and safe distribution of the power to the load(s).

In the case of inverters, power from a DC source is provided to one or more loads, usually via a filter and then via a DC-link, including a DC-link capacitor, which smooths the supply voltage to the load(s). If the source is AC, a rectifier will also be provided to convert to DC before the DC-link.

Such source converters are in recent times finding greater application in the aircraft industry where there is a trend away from hydraulic systems and pneumatic systems to so-called 'more electric aircraft' (MEA) using electric sub-systems, such as electrical actuators, and controls. In the case of actuators, source converters are applied as motor drives.

Particularly in aircraft applications, but also in other applications where such source converters are used, weight, size, cost and reliability are all important factors. The DC-link capacitor usually represents a significant portion of the size of the system. Therefore, it would be desirable to reduce the size of the DC link capacitor as much as possible.

With the objective of reducing size and weight, as well as cost and complexity, new electric actuation architectures are being proposed in which two or more motor drive circuits share the same DC-link. These motor drive circuits may operate different loads/electric machines.

One of the driving factors for DC-link capacitor size is the current ripple flowing through it. It has been found, however, that the motor drive controllers can be synchronised so as to reduce overall ripple at the DC-link. Then the DC-link components including the DC-link capacitor can be smaller. Filter requirements can also be reduced.

The impact of interleaving carriers on a DC-link in inverters has been studied for parallel voltage source converters, in Zhang, Wang, Burgos, Boroyevich, "DC-Link Ripple Current Reduction for Paralleled Three-Phase Voltage-Source Converters With Interleaving", IEEE Trans. Power Electron., September 2011; and Open access PhD thesis from Virginia Tech available in the following link (see pages 46 to 71): https://theses.lib.vt.edu/theses/available/etd-05072010-115156/unrestricted/Zhang_Di_D_2010(Updated).pdf. Also, interleaving of parallel drives to minimise switching ripple on the AC side of such systems is described in U.S. Pat. No. 7,109,681.

It has been demonstrated in the prior art that interleaving carriers on paralleled voltage source inverters can effectively reduce the DC-link current ripple. This is illustrated in FIG. 2, where two inverters are shown. The dotted line and dashed line carriers would correspond to the modulation of each inverter, respectively.

There is, however, a need for an improved control for synchronising operation of a system having non-paralleled source inverters, or motor drives for respective, separated loads but sharing a common DC-link, whilst minimizing the required DC-link capacitance.

SUMMARY

The present disclosure provides a power converter system comprising: a power source; a plurality of source converters for driving respective loads; the plurality of source converters connected to the power source via a common DC-link, control means for driving the source converters by means of respective control signals modulated onto respective modulation carriers; and means for synchronizing the control means such that the respective modulation carriers are interleaved with a selected phase shift therebetween.

The disclosure also provides a method of controlling operation of a plurality of voltage source converters connected to a power source via a common DC-link, the method comprising synchronizing modulation carriers onto which respective control signals of the converters are modulated such that the respective modulation carriers are interleaved with a pre-selected phase shift therebetween.

The power source may be AC or DC.

The source converters may be voltage, current, impedance, etc. source converters.

The control means may comprise separate control devices on separate or on a single platform, or a common control device.

BRIEF DESCRIPTION OF THE DRAWINGS

The improvement is applied to architectures having non-paralleled voltage source inverters (i.e. feeding separated loads or connected to independent AC buses) that share a common DC-link.

in FIG. 1B, but could be adapted for an AC supply such as shown in FIG. 1A.

FIGS. 4a-4d show the results of a simulation of a system incorporating the control of this disclosure.

DETAILED DESCRIPTION

Preferred embodiments will now be described, by way of example only, with reference to the drawings.

The structure of the systems in which the control of this disclosure is to be incorporated will first be described with specific reference to FIGS. 1A and 1B.

Figure 1A:
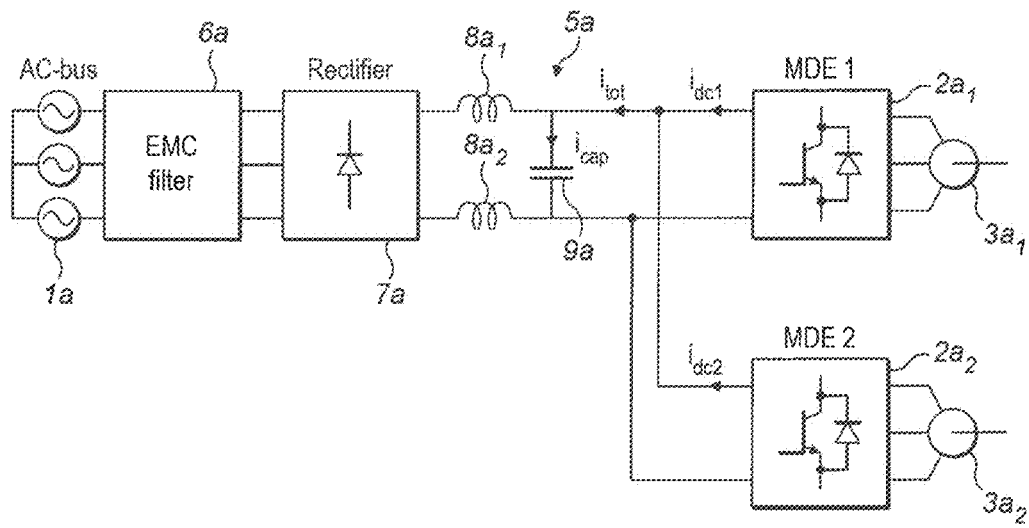
FIG. 1A is a schematic view of an AC-voltage fed architecture including multiple voltage source converters applied as motor drives that share a common DC-Link.
Figure 1B:
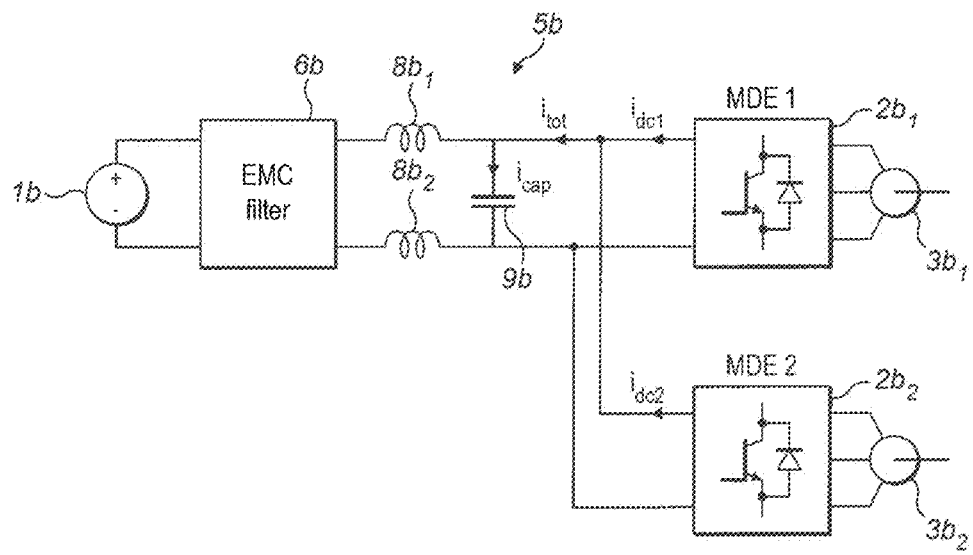
FIG. 1B is a schematic view of a DC-voltage fed architecture including multiple voltage source converters applied as motor drives that share a common DC-Link.
Figure 2:
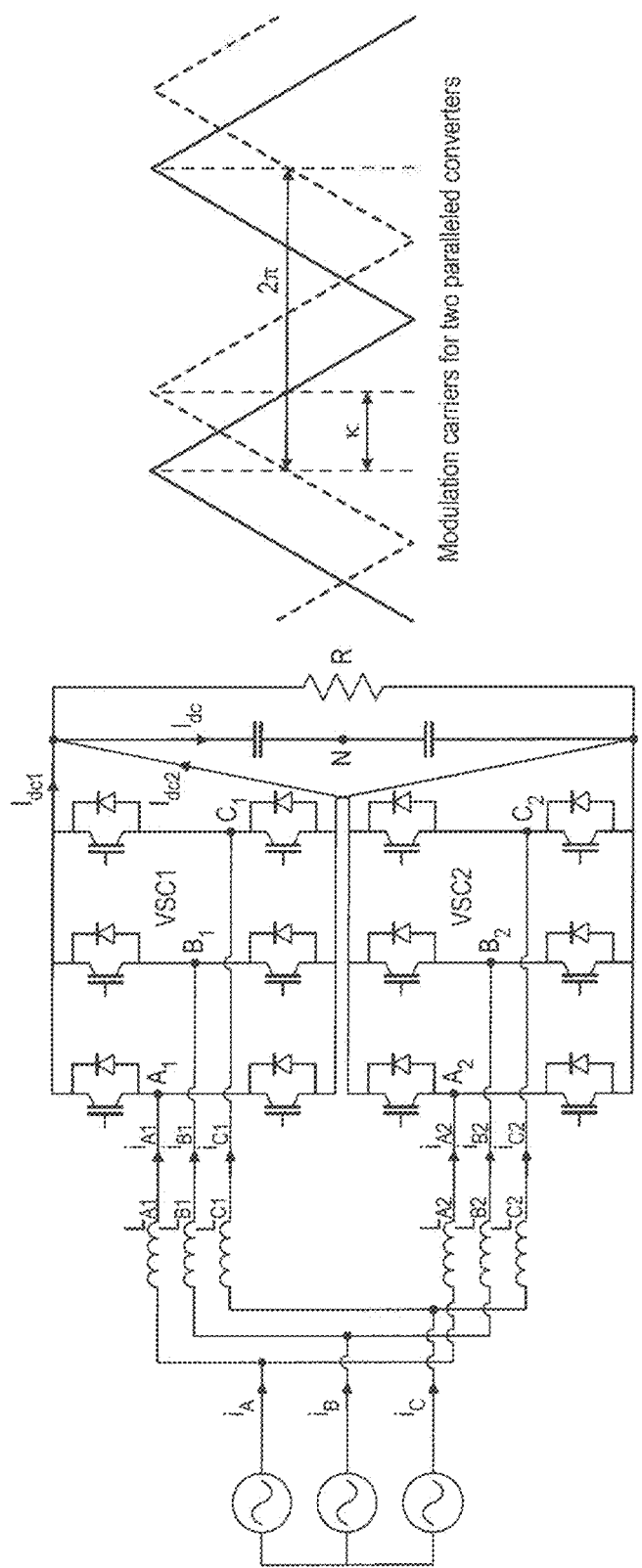
FIG. 2 is a simple circuit diagram showing interleaving of modulation carriers for parallel voltage source converters as described in the prior art discussed above.

The systems consist of a power supply (AC source 1*a* in FIG. 1A and DC source 1*b* in FIG. 1B). Power is supplied to multiple motor drive electronics (MDEs) 2*a*1,2*a*2;2*b*1, 2*b*2, connected to a common DC-link, each driving a respective motor drive 3*a*1,3*a*2; 3*b*1,3*b*2. Power is supplied to the loads via a DC-link 5*a*,5*b*, typically via an electromagnetic compliance (EMC) filter 6*a*,6*b*. In the AC system, the AC is converted to DC by means of a rectifier 7*a*.

The DC-link 5*a*,5*b* typically comprises coupled inductors 8*a*1, 8*a*2; 8*b*1, 8*b*2 between the source and a DC-link capacitor 9*a*, 9*b*. $i_{TOT}$ is the total DC-link current and $i_{cap}$ is the current flowing through the DC-link capacitor in order to minimize the ripple of the inductor current ($i_{TOT}+i_{cap}$). These inductors may or may not be present depending on the particularities of each application.

It is known in the state of the art, as mentioned above, to have several parallel voltage source converters connected to the same AC bus, or sharing the same load, to be modulated or interleaved to minimize either the DC-link current ripple or the AC current ripple. By applying interleaving, the phase of the selected switching harmonics can be shifted so that the sum of such harmonic components can be null if the phase shift of the targeted harmonics is tuned to be 180 degrees.

There is also a need to minimise ripple in non-parallel drive systems where the MDEs share a single DC-link, as shown in FIGS. 1A and 1B.

Figure 3:
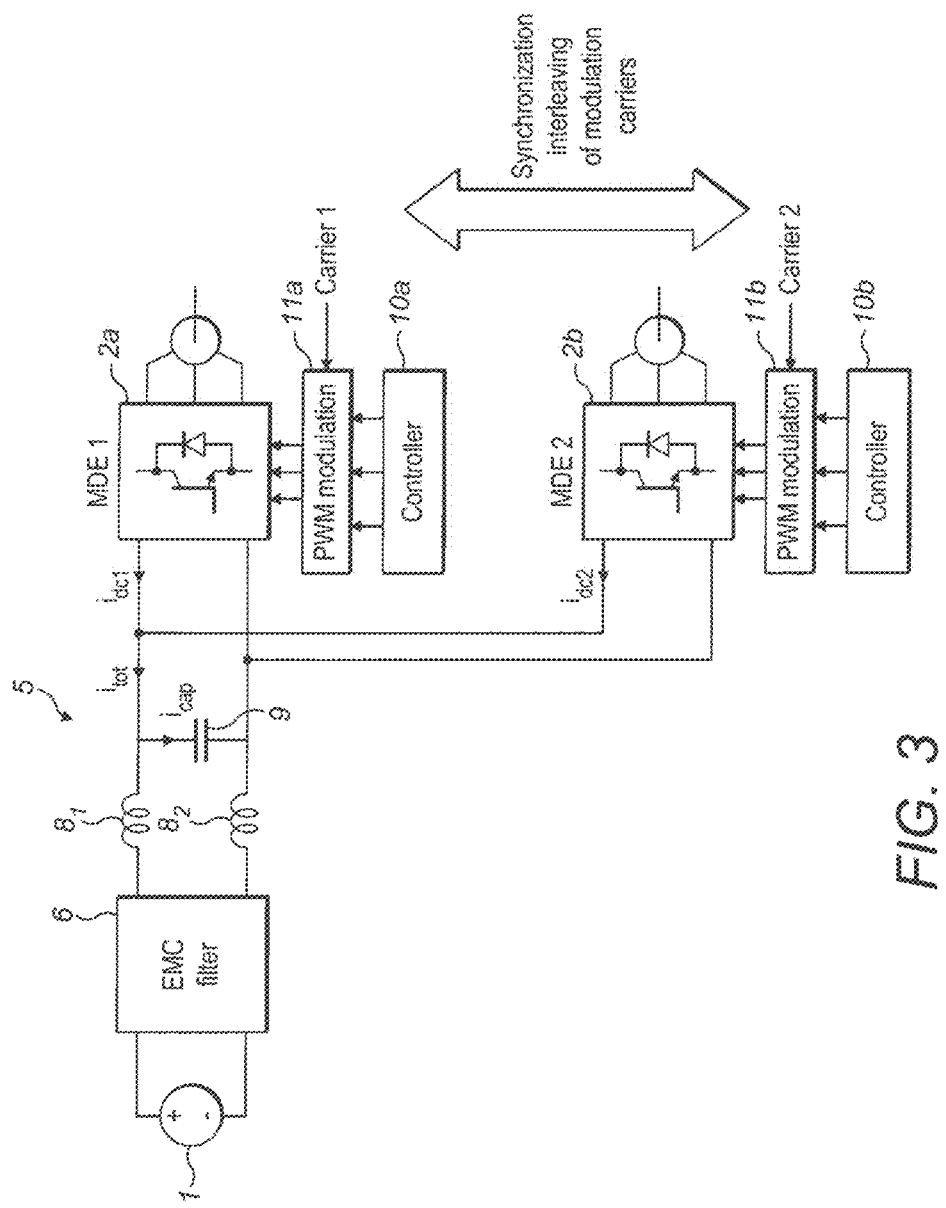
FIG. 3 is a simple circuit diagram of an architecture including (non-paralleled) motor drives that share a common DC-link and that drive separated electrical motors, and incorporating the control of the present disclosure. This shows a DC supply, as e.g.

The inventors have realised that, in such cases, interleaving carriers in a manner similar to that proposed above can bring benefits to the DC-link capacitor reduction in architectures with non-paralleled voltage source converters that share a common DC-link. This requires synchronization between the modulation signals as illustrated in FIG. 3. This may be done by an internal signal in the case that both inverters share the same controller, or by using communication between controllers.

The present disclosure adapts systems such as shown in FIGS. 1A and 1B such that the motor controls are synchronized so that interleaving of the modulation carriers is achieved to minimize selected DC-link current harmonics. According to the disclosure, as can best be seen in FIG. 3, the control signals, from the controllers 10*a*, 10*b*, for the respective motor drive electronics 2*a*, 2*b* are modulated onto respective modulation carriers, carrier 1 and carrier 2, by e.g. PWM modulation 11*a*, 11*b* and the modulation carriers, carrier 1 and carrier 2, are interleaved such that are synchronised and the phase shift between them is set to a target value.

Only two MDEs are shown here for ease of explanation. Of course, any number of non-parallel MDEs sharing DC-link (2*a*, 2*b*, 2*z*) could be used in the same way, with all of their respective carriers interleaved.

Figure 4A:
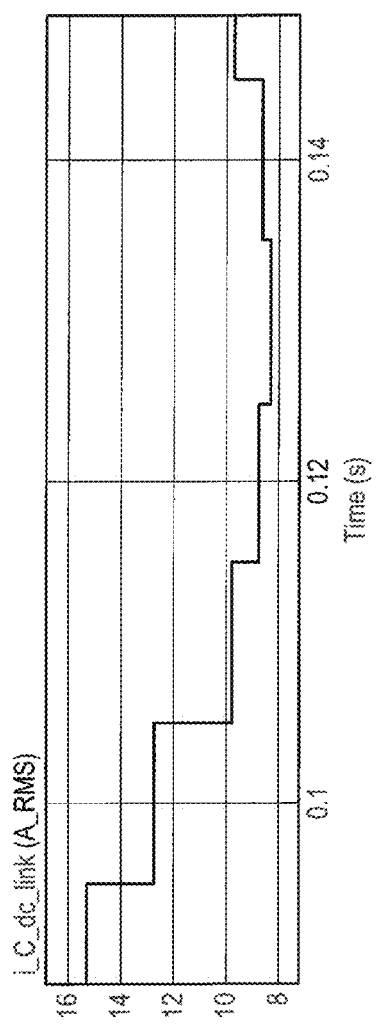
Figure 4B:
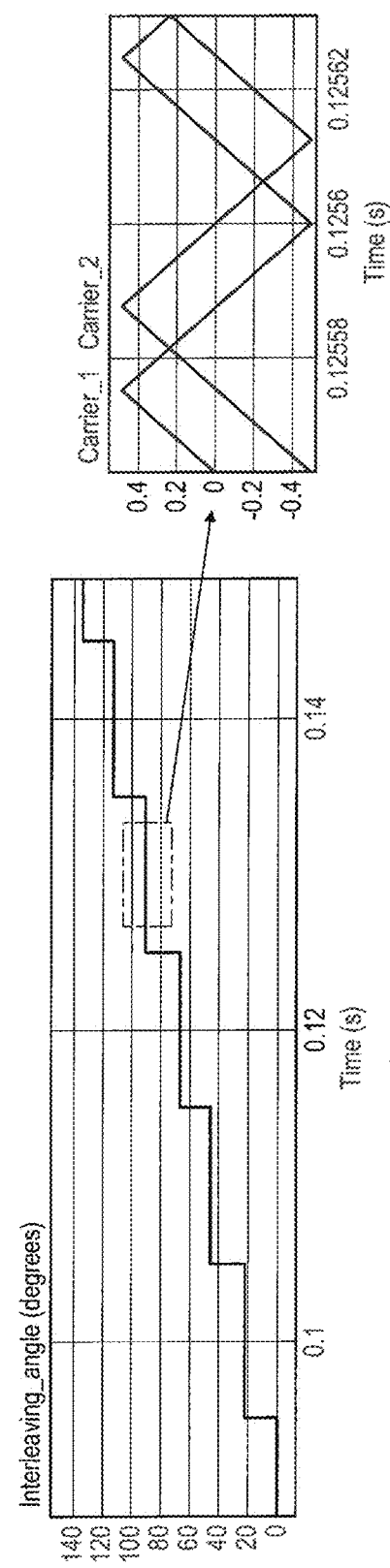

The modulation carriers are interleaved by a pre-defined angle to minimise the current flowing through the DC-link capacitor. The carriers preferably interleave with a 90 deg. phase difference. This has been found to be the optimum angle if the power factor at the load side is high. Other angles can be selected depending on the particularities of the application. The effects of different angles can be seen in FIG. 4 which shows the results of simulation of a system having two motor drives driving independent loads and sharing a DC link. The interleaving angle is changed every 10 ms (see FIGS. 4*a* and 4*b* for the respective MDEs). FIG. 4*c* shows the RMS current through the DC link capacitor for the different angles. FIG. 4*d* shows the phase current of each motor (M1 and M2), which have same magnitude and phase in this example. As can be seen, maximum ripple occurs with a 0 deg. angle and minimum ripple occurs with a 90 deg. angle. In the simulation, the reduction in RMS current between 0 deg. and 90 deg. was over 40% which means that more than 60% less power is dissipated in the DC-link capacitor (benefits are observed also for different current magnitude and phase). This enables reduced DC-link capacitance and also EMI filter and inductor reduction. It should be noted that similar results are achieved even if the rating of the motor drives or loads are different, as long as the same switching frequency is used for both.

A phase-locked loop mechanism or other synchronisation means may be required, in practice, to keep the interleaving angle at the desired value.

The controller (10*a*, 10*b*) and PWM modulator (11*a*, 11*b*) are shown separately for ease of reference; these components can be realised in different ways known to those in the art, for example, all mounted on a single common platform, or formed as separate units with a common bus.

The interleaving is carried out by means of a communication signal between the controllers 10 of the drives 2. This signal could e.g. be in the form of a flag that enables synchronisation of modulation carriers so that minimum data needs to be communicated. Some existing systems do already have communication between MDEs and so this can be used for communication the synchronisation signal without the need for additional hardware.

Whilst FIG. 3 shows a DC system, the system can be easily adapted for an AC system as shown in FIG. 1A, as only the MDE end is modified to incorporate a passive rectifier, or an active rectifier.

Considerable benefits in terms of size, weight, cost and complexity are thus achieved by interleaving the modulation carriers of MDEs sharing a DC-link and driving separate loads.

The invention claimed is:

1. A power converter system comprising:
   a power source;
   a plurality of source converters for driving respective loads;
   the plurality of source converters connected to the power source via a common DC-link,
   control means
   for driving the source converters by means of respective control signals modulated onto respective modulation carriers; and
   means for synchronizing the control means such that the respective modulation carriers are interleaved with a pre-determined phase shift therebetween.

2. The power converter system of claim 1, wherein the power source is a DC power source.

3. The power converter system of claim 1, wherein the power source is an AC power source, and further comprising a rectifier between the power source and the DC link.

4. The power converter system of claim 1, wherein the power source is a single power source common to each source converter.

5. The power converter system of claim 1, wherein the source converters are voltage source converters.

6. The power converter system of claim 5, wherein the voltage source converters are motor drive circuits.

7. The power converter system of claim 1, wherein the control means comprises a single platform having a controller for each source converter.

8. The power converter system of claim 1, wherein the control means comprises a separate control device for each source converter.

9. The power converter system of claim 1, wherein the control means comprises a control device common to all the source converters.

10. The power converter system of claim 1, wherein the control signals are pulse width modulated, PWM.

11. The power converter system of claim 1, wherein the phase shift is selected to provide a 90° angle between the interleaved carriers.

12. The power converter system of claim 1, wherein the phase shift is selected to provide a 180° angle between selected harmonics.

13. The power converter system of claim 1, wherein the control means are synchronized by means of a communication link therebetween.

14. The power converter system of claim 1, wherein the respective loads are all different from each other.

15. A method of controlling operation of a plurality of voltage source converters connected to a power source via a common DC-link, the method comprising:
  providing a modulation carrier for each of the source converters,
  interleaving the modulation carriers with a predetermined phase shift between them; and
  modulating a respective control signal for each source converter on each modulation carrier.

16. The method of claim 15, wherein the phase shift is selected to provide a 90° angle between the respective modulation carriers.

* * * * *